UNITED STATES PATENT OFFICE.

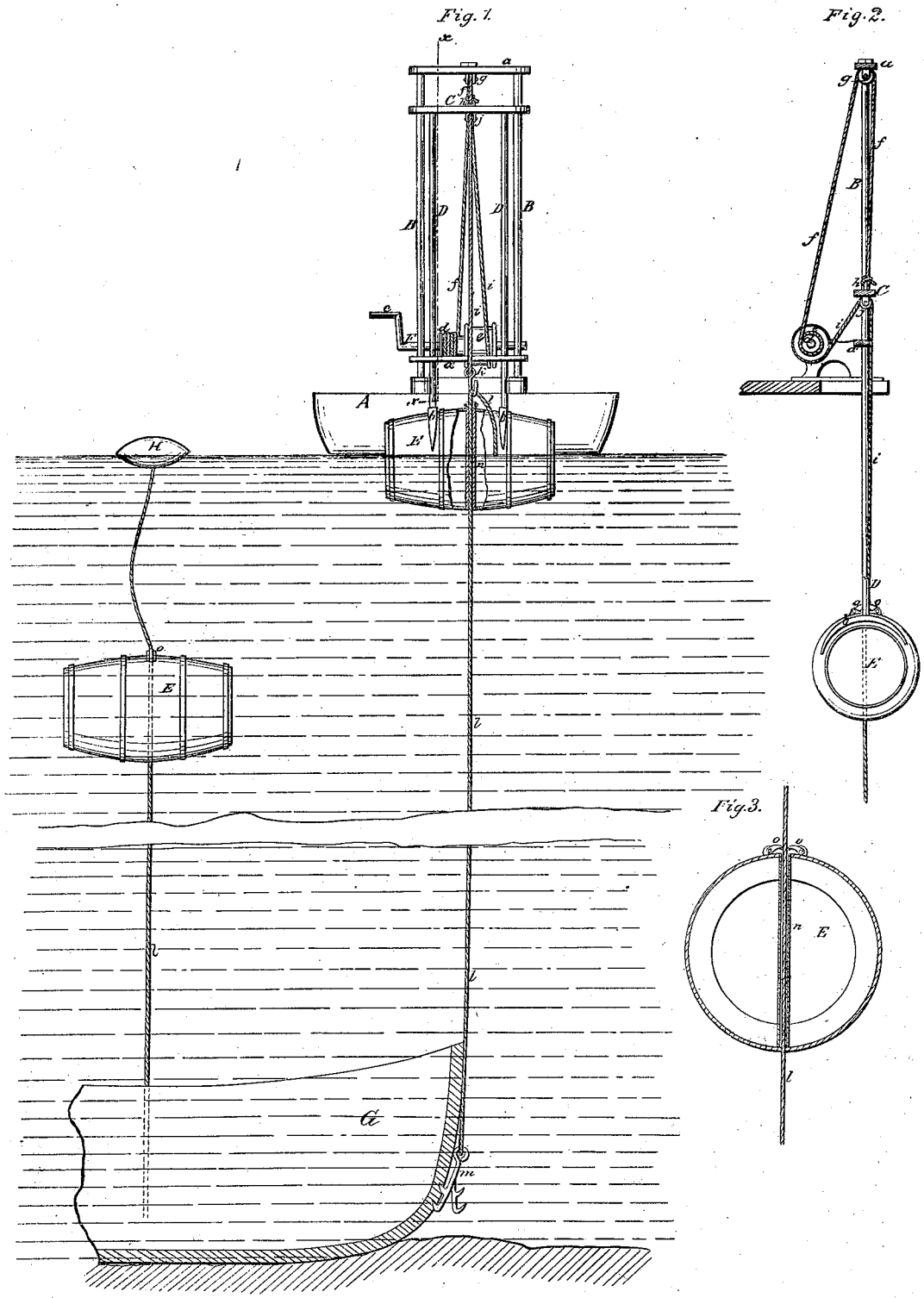

THOMAS WHITTAKER, OF BUFFALO, NEW YORK, ASSIGNOR TO HIMSELF AND WM. P. SIMPSON, OF SAME PLACE.

IMPROVED APPARATUS FOR RAISING SUNKEN VESSELS.

Specification forming part of Letters Patent No. 55,026, dated May 22, 1866.

*To all whom it may concern:*

Be it known that I, THOMAS WHITTAKER, of the city of Buffalo, in the county of Erie and State of New York, have invented a new and Improved Apparatus for Raising Wrecked or Sunken Vessels; and I do hereby declare that the following is a full and exact description thereof, reference being had to the accompanying drawings, making part of this specification, in which—

Figure 1 is a view, in elevation, of my apparatus, represented as on board of a vessel, in the act of sinking a cask connected by a rope to the wreck beneath, and also showing a cask attached to the wreck and buoyed in its proper position. Fig. 2 is a vertical section of the same in the plane of line $x\,x$, Fig. 1, showing a cask forced down to nearly its proper depth. Fig. 3 is a central cross-section of a cask, representing the tube through which the rope passes and the pawls which engage with the latter and prevent the cask from rising.

Like letters of reference indicate corresponding parts in all the figures.

My improvements relate to the method of raising vessels or other sunken objects by forcing beneath the water empty air-tight casks, which are connected to the wreck or object to be raised by ropes or other suitable means, of sufficient numbers by their buoyancy to elevate the wreck; and they consist in forming a central passage through the cask for the rope by means of a tube, so as to leave the cask air-tight, by which the rope connecting the wreck and apparatus is made to act as a guide in forcing down the casks, and in combination with suitable pawls attached to the latter to prevent its rising, and the combination and arrangement of the apparatus for forcing down the casks and at the same time keeping the guide-rope taut.

As represented in the drawings, A is a large or other suitable vessel, on which the forcing apparatus is fastened in any suitable manner. B B are two upright guides, forming, with the cross-piece $a\,a'$ at their top and bottom, the frame of the apparatus. C is a cross-head which slides up and down the guides A A. D D are bars or rods pendent from this cross-head, passing through $a'$, and provided at their lower ends with forked or curved portions $b\,b$, fitting the curvature of and resting upon the cask E, by which the latter is forced beneath the water in the manner presently to be explained.

F is an axle or windlass with a winch, $c$, and provided with two portions or drums, $d\,e$, the latter being of twice the circumference of the former. Attached to $d$ is a rope or chain, $f$, which passes thence over a pulley, $g$, mounted to the under side of cross-piece $a$, and down to the cross-head C, where it is fastened at $h$. To the drum $e$ is secured a similar rope or chain, $i\,i$, winding around it in an opposite direction from that around drum $d$, so that one will unwind as the other winds up, and vice versa. From the drum the rope $i$ passes over a pulley, $j$, mounted on the under side of cross-head C, and descends from thence, connecting, by means of a catch-hook clamp, $k$, or other suitable device, with the rope $l$, which is fastened to the wreck G by the grapple $m$, or by a diver or other means.

Extending through the cask E (preferably in the line of its diameter, as shown,) is a tube, $n$, Figs. 1 and 3, secured at its ends to the sides of the cask in such a manner as to leave the latter air-tight, through which tube the rope $l$ passes. At the upper end of this tube, when the cask or barrel is in its proper position, as shown, are attached to the cask two pawls, $o\,o$, arranged so as to permit the cask to slide down the rope, but to prevent its rising after being forced down.

The operation of my improvements is as follows: The rope $l$ being first secured to the wreck and passed through tube $n$ of a cask, and the cross-head C, with its pendants D D, raised to the top of the frame, as shown in Fig. 1, by turning the winch $c$ the ropes $i$ and $l$ are connected together by catch or clew hook $k$, and the curved portions $b\,b$ adjusted to the cask, as also shown in the same figure. These casks I prefer to make of a capacity of about one hundred and fifty gallons each, so that their buoyancy, which is equal to the amount of water displaced—*i. e.*, nearly eight pounds per gallon—will raise about twelve hundred pounds each. By turning the windlass in a direction to unwind rope $f$ and wind up rope $i$, the latter, by passing over pulley $j$ and being rigidly fastened to the wreck, draws down the cross-head C and bars D D, which forces the cask down rope $l$, (shown in Fig. 2,) the unwinding of one rope being just compensated by the winding up of the other. I prefer to force the casks down only about ten to fifteen feet at a time, when, by reversing the windlass, the pressure is removed from the cask, and the pawls o o engage with the rope l, (shown most clearly in Fig. 3,) and prevent the cask from rising by sliding up the rope. A buoy, H, is then attached to the upper end of rope l, as represented at the left in Fig. 1, when a second rope is attached to the wreck and another cask forced down. This operation is repeated till a sufficient number of casks have been forced down to raise the wreck so that the casks will float on the surface. Then by again successively forcing them down the wreck is raised another ten or fifteen feet, and so on till brought to the surface.

If preferred, the drum d may be dispensed with, in which case the cross-head may be easily elevated by pulling by hand on the rope f, as but little power will be required for the purpose, when the rope i may wind around the common roller of the windlass.

The chief advantages of my invention are, the great simplicity and cheapness of the apparatus required compared with that of the ordinary methods employed. The rope l being kept taut during the operation, forms a guide for the cask, which enables it to be forced directly downward with great facility and with comparatively but little strain upon the apparatus. The employment of the tube n enables the rope to pass centrally through the cask and thus retain it in its natural and proper position, while, with the pawls o o, it forms a secure and reliable fastening to rope l and the wreck.

When the sunken vessel is partially raised it may be towed into more shallow water, and in the event of a storm arising a sufficient number of the casks are loosened to allow the wreck to sink, when the casks still attached to the wreck will be at such a depth beneath the surface of the water as to be secure from the effects of the seaway. When the storm abates the loosened casks are again attached and forced down, when the wreck rises and the process of raising continued with but little loss of labor and none of materials or apparatus.

What I claim as my invention, and desire to secure by Letters Patent, is—

1. The tube n, in combination with the air-cask E, or its equivalent, constructed and arranged substantially as and for the purposes set forth.

2. In combination with the cask E and tube n, the pawls o o, operating in the manner and for the purpose described.

3. The combination and arrangement of the pendent bars D D, provided with the curved arms b b, guide-frame B B, with windlass F, and guide-rope l, for lowering casks to submerged wrecks, constructed and operating substantially as set forth.

THOMAS WHITTAKER.

Witnesses:
 J. FRASER,
 WM. P. SIMPSON.